UNITED STATES PATENT OFFICE.

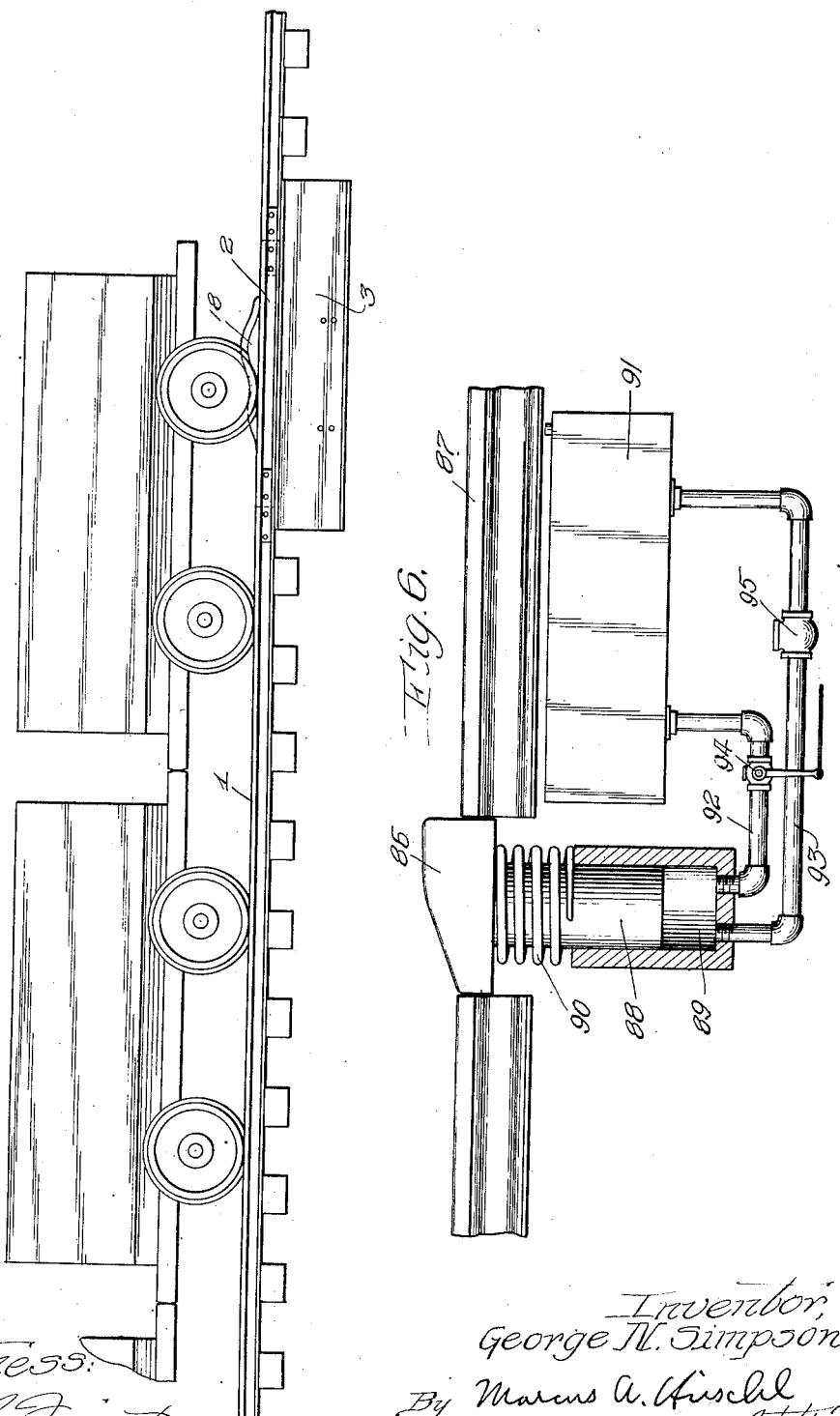

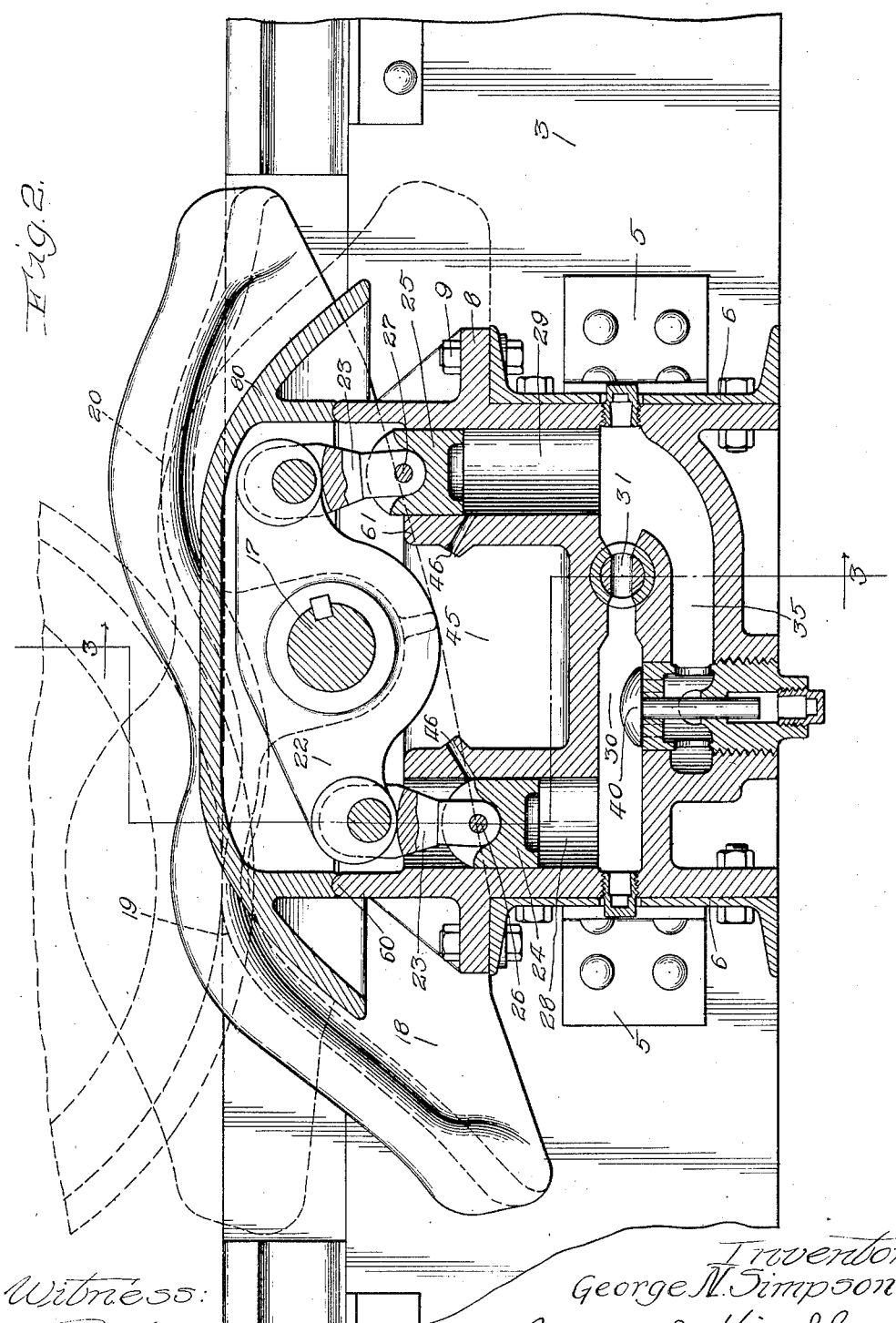

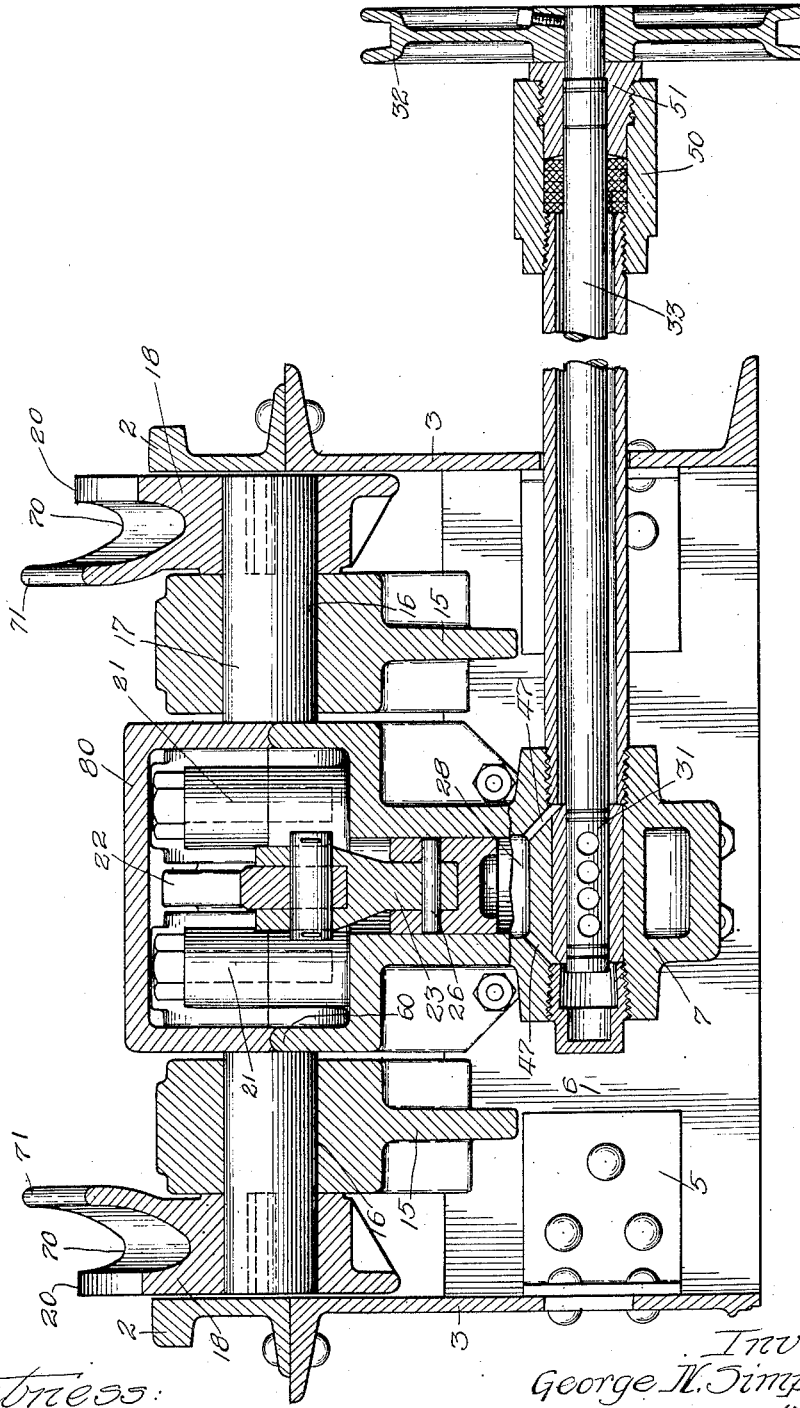

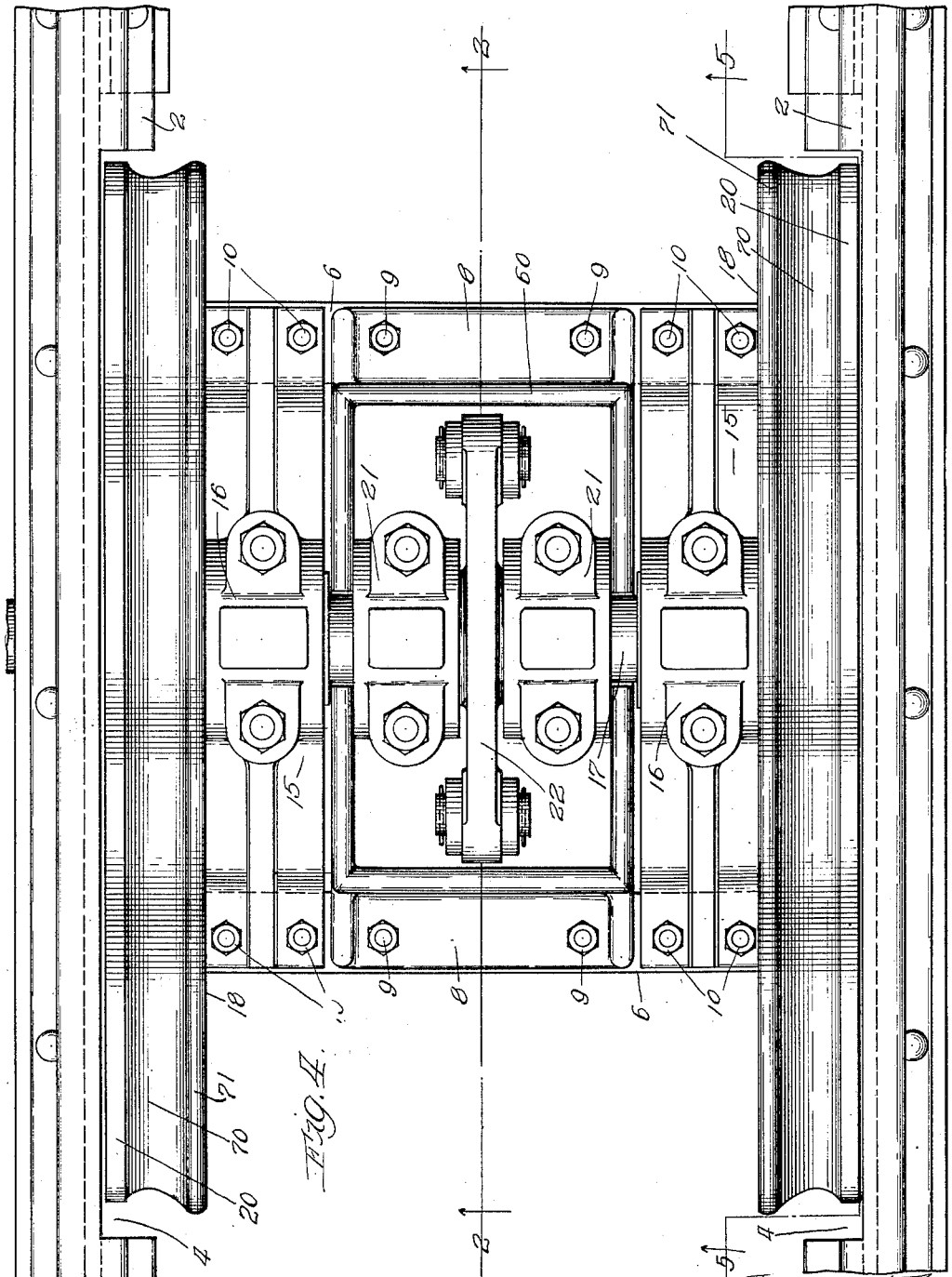

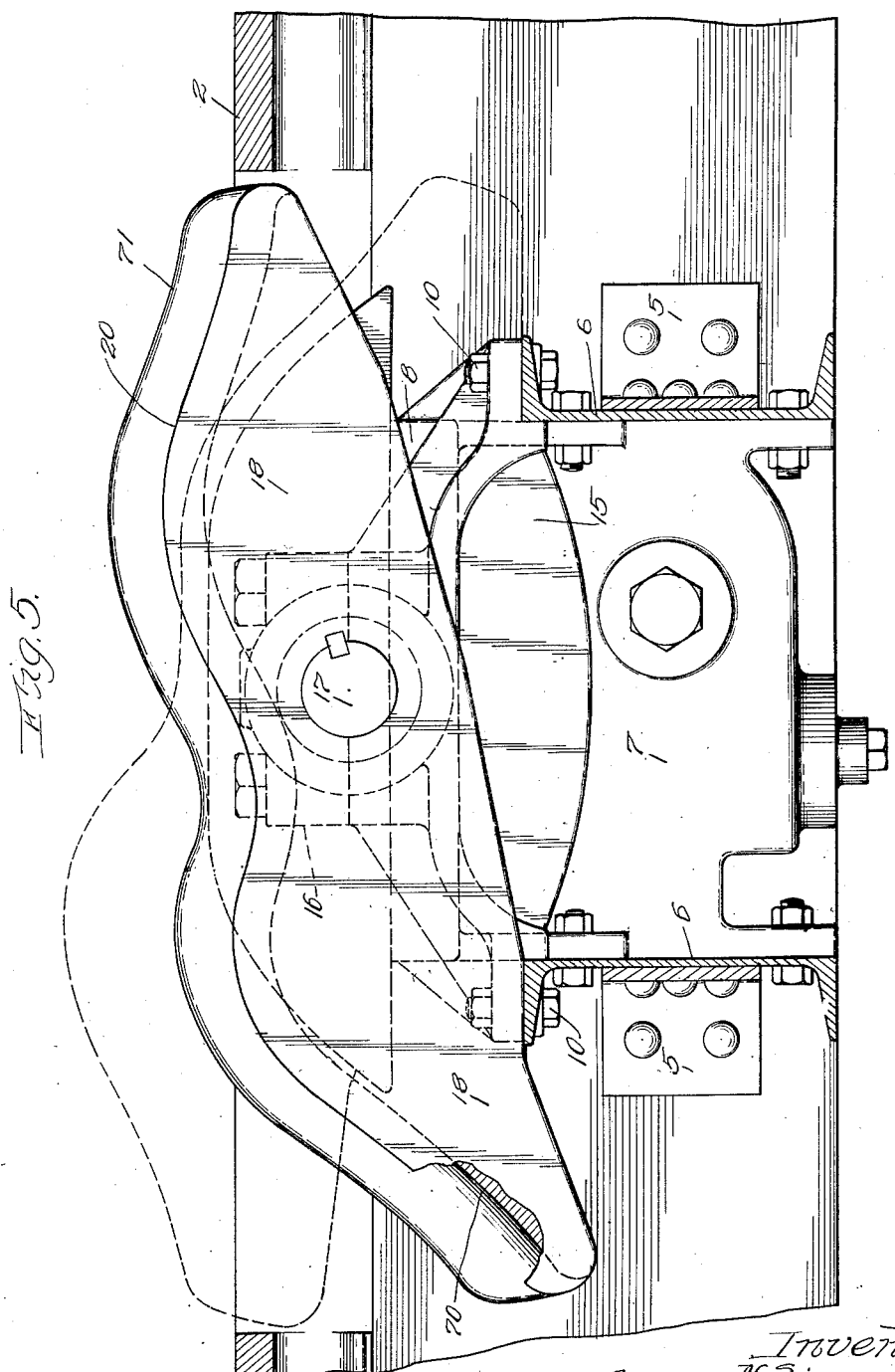

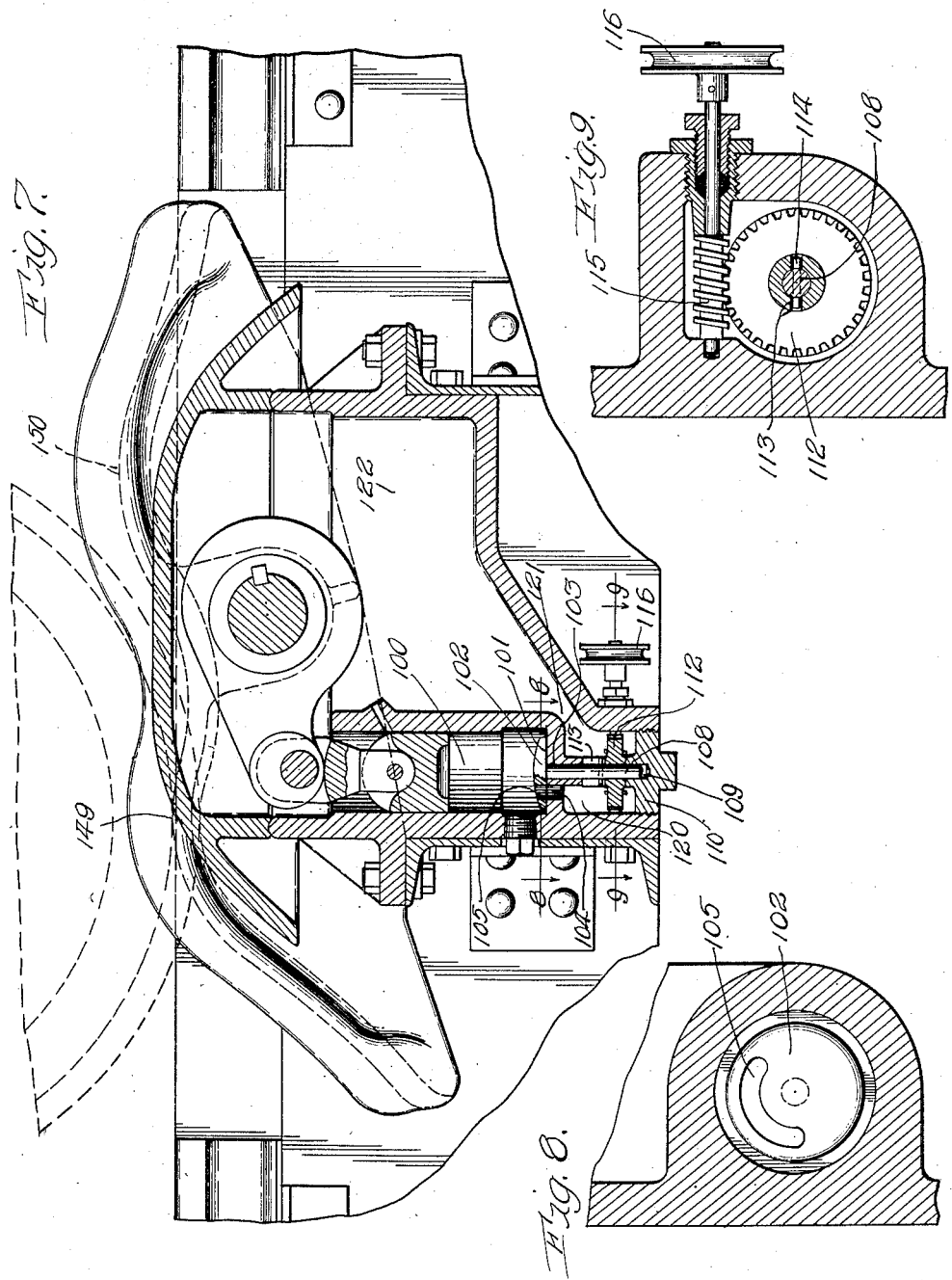

GEORGE N. SIMPSON, OF CHICAGO, ILLINOIS.

LIQUID CAR CONTROL.

1,349,387.  Specification of Letters Patent.  Patented Aug. 10, 1920.

Application filed April 2, 1919. Serial No. 287,039.

*To all whom it may concern:*

Be it known that I, GEORGE N. SIMPSON, a citizen of the United States, residing at Chicago, in the county of Cook and State of Illinois, have invented new and useful Improvements in Liquid Car Controls, of which the following is a specification.

This invention relates to improvements in liquid car controls and is more especially adapted for use in connection with mine cars. In the unloading of mine cars it is customary to feed the loaded cars to the unloading mechanism by allowing them to run down an inclined track in trains or trips. Since the unloading process requires a certain amount of time for each car or group of cars, it is necessary that a predetermined number of cars at a time be permitted to enter the unloading apparatus, while the remaining cars on the inclined track are held back. Heretofore this usually has been accomplished by the use of a manually operated sprag or stop which was released to allow a predetermined number of cars to pass and then again raised in order to prevent the remaining cars on the inclined track from approaching the unloading mechanism. The operation of such a sprag or stop required considerable manual effort and the constant attention of an operator to release it when it was desired to permit cars to pass and to re-set it again immediately after the passing of the required number of cars in order to stop the next succeeding car. If the resetting operation was not promptly done, or if it was improperly done, so that too many cars were allowed to pass, considerable damage frequently was done at the unloading apparatus.

I have devised a car control which eliminates the objections to the old devices above refered to. In addition, my improved car control is easily and quickly operated, and is automatically raised by each passing car so that if desired, it may be set by the mere closing of a valve and thus fixed in condition to prevent more cars from passing. In addition to the foregoing, it contains the very important feature which permits it to be so adjusted or set that it will automatically retard a car and then allow it to pass, and thus control a succession of cars without any further setting, adjustment, control or attention of whatsoever kind by an operator.

A complete car control embodying the principles of my invention is illustrated in the accompanying drawings and fully explained in the following specification and claims.

Figure 1 is a side elevation showing a part of an inclined railway track with my improved car control in place.

Fig. 2 is a longitudinal vertical section on the line 2—2 of Fig. 4.

Fig. 3 is a transverse vertical section on the line 3—3 of Fig. 2.

Fig. 4 is a top plan view of the device in place on a railway track with the cover removed.

Fig. 5 is a longitudinal vertical section on the line 5—5 of Fig. 4.

Fig. 6 is a diagrammatical sectional view of a modified form of the device.

Fig. 7 is a longitudinal section of a modified form of the device.

Fig. 8 is a horizontal section on the line 8—8 of Fig. 7.

Fig. 9 is a horizontal section on the line 9—9 of Fig. 7.

In detail, 1, 1 represents the inclined rails of a railway track leading downwardly toward the unloading apparatus (not shown). Two opposite short sections 2, 2 of these rails are supported by the channel irons 3, 3 and have their inner surfaces recessed to about one half their width as indicated at 4, 4. Riveted to the channels 3, 3 by means of the brackets 5, 5 are two smaller transverse channel irons 6, 6. Bolted between the two channel irons 6, 6 is a square box-like casting 7 which is additionally supported by the projecting flanges 8, 8 resting on top of the channel irons 6, 6 and bolted thereto by means of the bolts 9, 9. On each side of the casting 7, supported by the channel irons 6, 6 and bolted thereto by means of the bolts 10, 10 there is arranged a bearing support 15. The bearing supports 15, 15 at their central points support the bearings 16, 16, in which is journaled the transverse rocker shaft 17. Keyed to each end of the rocker shaft 17 is a rocker cam 18, lying within the recesses 4, 4 in the rails. The contour of the upper surface of the rocker cams 18, 18 is most clearly shown in Fig. 2, from which it will be noticed that each such upper surface has two rounded raised parts or humps 19 and 20. As will be more specifically described hereafter the shaft 17 is permitted to rock to such an extent that either of the humps 19 or 20 on the rocker cams may be depressed so that its top point will be level with the upper surface of the rail, and when in such position the other hump on the same cam will project above the top surface of the rail. The rocker shaft 17 is further supported by the two bearings 21, 21 formed in the upper part of the casting 7.

Keyed to the shaft 17 at its center part is the walking beam 22, having at each of its ends a connecting rod 23 with pistons 24 and 25 attached to the lower ends by means of the wrist pins 26 and 27 respectively. The pistons 26 and 27 operate respectively in the cylinders 28 and 29 which are formed in the casting 7.

The two cylinders are connected at their lower ends by the port 30. Passageway through the port 30 is controlled by the valve 31 which is operated by the wheel 32 at the end of a horizontal shaft 33. A by-pass or port 35 is arranged to permit liquid to pass from cylinder 29 to cylinder 28, independently of the valve 31 and through the check valve 40. The check valve 40, however, prevents liquid from passing in the reverse direction.

The casting 7 is made with a cylindrical depression or reservoir 45 between the two cylinders. Small ports 46, 46 lead from the reservoir 45 to the two cylinders. Two small ports 47, 47 also lead from the bottom of the reservoir 45 to the valve stem 33. The valve stem 33 is packed at its outer end by means of the packing rings 50, 50 and the packing nut 51 in the ordinary manner.

The sides 60, 60 of the casting 7 extend somewhat higher than the sides 61, 61 of the reservoir 45. The inside of the casting 7, the cylinders 29, 29, the ports and reservoir 45 are all filled with oil or other suitable liquid to a height about half way between the upper edge 61 of the reservoir 45 and the upper edge 60 of the casting 7.

The rocker cams 18, 18 contain grooves 70, 70 along their upper surfaces parallel with the cam surfaces for the accommodation of flanges on passing car wheels. To the inside of the grooves are projecting flanges 71, 71 which serve as additional guards to keep the wheels of passing cars on the tracks.

In the operation of the device, with the rocker cams shown in the position indicated by the solid lines in Fig. 2, (the hump 19 having been depressed by a car wheel), the wheel of a passing car will depress the second hump 20. During this operation liquid is forced from the cylinder 29 to the cylinder 28 through the port 35 and check valve 40, and the hump 19 will then be raised above the surface of the rail. If the valve 31 be then closed, the liquid under the piston 24 will be confined in the cylinder 28 and the hump 19 will then be prevented from descending and will act as a stop for the succeeding car wheel. When it is desired to permit this wheel to pass, the valve 31 is opened, thus permitting liquid to flow from cylinder 28 through the port 30 into the cylinder 29 permitting the hump 19 to be depressed by the passing car wheel. It must be noted that the check valve 40 will always permit liquid to flow from cylinder 29 to cylinder 28 freely regardless of the position of the valve 31. It is apparent therefore, that the piston 25 which is below the second hump 20, is always permitted to descend freely, so that a passing car wheel will always depress the second hump 20 to the level of the rail and thus raise the first hump 19 to its highest position. When the hump 19 is thus in its raised position the valve 31 may be closed so that it will be held in that position and act as a stop for the next wheel on a car or the valve 31 may be only partly opened, as explained heretofore, so that the next wheel on a car will be merely retarded as it presses against the hump 19 and forces the same down slowly, and then will be allowed to pass.

If it is desired to have the control operate automatically so that each car will be retarded and then allowed to pass, the valve 31 is adjusted so that liquid may flow slowly through it thus permitting the hump 19 to descend slowly upon being pressed against by a car wheel. The car wheel is thus retarded but allowed to pass. Upon passing it will depress the hump 20 by forcing the liquid through the port 35 and check valve 40 back into the cylinder 28 and again set or raise the first hump 19 so that the next succeeding wheel will be retarded in the same manner but allowed to pass.

The small ports 46, 46 and 47, 47 leading from the reservoir 45 to the cylinders 28 and 29 and to the valve stem 33 serve to keep the cylinders and the space surrounding the valve stem completely filled with oil at all times. A cover 80 is made to fit on top of the casting 7 by having its bottom edge concaved and adapted to rest on the upper edge of the casting 7.

In Fig. 6 there is shown diagrammatically a modified form of the device, in which a stop 86 projecting above the surface of the rail 87 is fastened on top of a plunger 88 which is fitted into the cylinder 89. The plunger is held in its raised position by means of a spiral spring 90. The cylinder 89 is connected with a tank 91 by means of two pipes 92 and 93. Passage through the pipe 92 is controlled by the valve 94. A check valve 95 permits liquid to flow from the tank to the cylinder 89 but not in the reverse direction. In the operation of this device, when it is desired to permit a car wheel to pass freely the valve 94 is opened, thus permitting the wheel to pass over the stop 86 by depressing the same and forcing the oil from the cylinder 89 into the tank 91. If it is desired to stop a car the valve 94 is closed, thus confining the oil in the cylinder 89, under the plunger 88 preventing the stop 86 from being depressed. If it is desired to allow the wheel to pass slowly the valve 94 is opened only part way, thus allowing oil to pass from the cylinder 89 through the valve 94 slowly, so that the stop 86 will descend slowly. Upon the passing of a car wheel the spiral spring will immediately raise the stop regardless of the position of the valve 94; oil flowing from the tank 91 to the cylinder 89, through the pipe 93 and check valve 95.

The modified form shown in Fig. 7 is constructed with only one cylinder. This cylinder 100 is arranged under the first hump substantially the same as cylinder 28 in the device shown in Fig. 2. Instead of their being a second cylinder and piston under the second hump to force the liquid back into the first cylinder when its piston is raised, barometric pressure is relied upon to accomplish this. At the bottom of the cylinder 100 is arranged the valve 101 which is shown more in detail in Figs. 8 and 9. This valve consists of a mushroom shaped part 102, the disk of which is within the cylinder 100 and the stem of which extends downward through a central opening 103 in the cylinder. At the bottom of the cylinder to one side of the central opening 103 there is also a port 104 which is covered by the disk 102. The disk 102 also has a port or opening through it 105, and is arranged so that it may be rotated so that the opening 105 and the port 104 may be made to coincide or so that the port 104 may be covered by the solid part of the disk 102. In this manner, by rotation of the disk 102 exit from the cylinder 100 through the port 104 may be opened or closed or opened to any desired extent. Means for rotating the disk 102 are provided as follows: The stem 108 on the bottom of the disk 102 extends downwardly and at its bottom end is pivoted in the opening 109 bored in the plug 110 which is screwed from the bottom into the casting. Mounted loosely on the stem 108 and resting on the plug 110 is the pinion 112. The pinion 112 has a long hub with a vertical slot 113 at the upper end. A pin 114 lies within this slot 113 and extends through the valve stem 108. It will thus be seen that rotation of the pinion 112 will rotate the valve stem and disk 102 and open or close the port 104. The pinion 112 may be rotated by means of the worm 115 which is operated by the wheel 116 as shown in Fig. 9. It will be noted that with this construction the valve 102 will also operate as a check valve as it is permitted to be raised, the pin 114 sliding freely up and down in the slot 113. Therefore, regardless of the position in which it may have been adjusted by means of the worm and pinion and regardless of whether the opening 105 in the disk covers the port 104 liquid is always free to flow into the cylinder either through the opening 105 if it coincides with the port 104 or by merely raising the valve disk 102 if it does not.

Passage from the cylinder 100 leads through the port 104 into the chamber 120 surrounding the valve stem, and from this chamber through the port 121 into the reservoir 122. The device operates substantially the same as that shown in Figs. 1 to 5, except that whenever the piston in the cylinder 100 is raised, liquid is forced back into the cylinder through the port 121 and opening 104 by means of barometric pressure on the liquid in the reservoir 122. It is apparent therefore, that as a car wheel passes the second hump 150, it will be freely and quickly depressed and the first hump 149 raised to its top position. When the hump 149 is thus raised, the disk 102 may be turned so as to close the opening 104 and thus confine liquid in the cylinder 100 beneath the piston so that the hump 149 cannot be depressed by the next car wheel and will consequently act as a stop. If it is desired, however, to permit the next car wheel to pass, the valve 102 is opened. If it is desired to have the device act automatically, so that it will retard a car wheel and then allow it to pass, the valve 102 is only partly opened, so that liquid may be permitted to escape slowly from the cylinder by a wheel and then permit it to pass. It will be noted, that because of the check valve feature, of the valve 101, that the second hump 150 always will be quickly and freely depressed by a passing car wheel regardless of the position of the valve and thus raise the first hump 149 to its uppermost position, where it may be set as desired.

Although I have shown my device as adapted for use in connection with the unloading of mine cars, and for feeding cars to an unloading mechanism, I do not wish to be limited by such declarations, as it is apparent that the device may be used in connection with cars of any sort and for feeding cars to any other mechanism, such as a scales, cage, shaft, hoist, etc., or may be used for retarding, stopping, or controlling cars or the progress of cars for any purpose whatsoever.

I claim:

1. In a car control, the combination of a stop adapted to be displaced out of the path of a car wheel by contact of said car wheel, and means for controlling the displacement of such stop.

2. In a car control, the combination of a stop adapted to be depressed by pressure of a car wheel, and means for controlling the descent of such stop.

3. In a car control, the combination of a stop adapted to be displaced out of the path of a car by contact of said car, means for controlling the displacement of such stop, and means actuated by a car for again restoring such stop to its normal position after displacement.

4. In a car control, the combination of a yielding stop adapted to be displaced out of the path of a car by said car, means for controlling the displacement of such stop, and means for again restoring such stop to its normal position.

5. In a car control, the combination of a yielding stop, adapted to be displaced out of the path of a car by said car, means for controlling the displacement of such stop, and means actuated by a car for again restoring such stop to its normal position after displacement.

6. In a car control, the combination of a stop adapted to be displaced out of the path of a car wheel by contact of said car wheel, and means whereby said stop may be prevented from being displaced or permitted to be displaced slowly.

7. In a car control, the combination of a stop adapted to be displaced out of the path of a car wheel by contact of said car wheel, means for controlling the displacement of such stop, and means for again restoring such stop to its normal position.

8. In a car control, the combination of a stop adapted to be displaced out of the path of a car wheel by contact of said car wheel, means for controlling the displacement of such stop, and means actuated by a car for again restoring such stop to its normal position after displacement.

9. In a car control, the combination of a stop adapted to be depressed by pressure of a car wheel, and means whereby said stop may be prevented from being depressed or permitted to be depressed slowly.

10. In a car control, the combination of a stop adapted to be depressed by pressure of a car wheel, means for controlling the depression of such stop, and means for again restoring said stop to its normal position after depression.

11. In a car control, the combination of a stop adapted to be depressed by pressure of a car wheel, means for controlling the speed of the depression of such stop, and means actuated by a car for again restoring such stop to its normal position after depression.

12. In a car control, the combination of a stop adapted to be displaced by a car, a liquid in a confined space so arranged that the displacement of the stop will compress the liquid, and means for controlling the escape of the liquid from the confined space.

13. In a car control, the combination of a stop adapted to be displaced out of the path of a car by contact of said car, and means for controlling the displacement of said stop, said means consisting of a cylinder, a piston adapted to be forced into the cylinder by said displacement of the stop, a fluid confined in the cylinder by the piston, an outlet to the cylinder, and means for controlling the outflow of the fluid from the cylinder through said outlet.

14. In a car control, the combination of a stop adapted to be depressed by a car, and means whereby said stop may be prevented from being depressed or permitted to be depressed slowly.

15. In a car control, the combination of a stop adapted to be depressed by a car, means for controlling the depression of such stop, and means for again restoring such stop to its normal position after depression.

16. In a car control, the combination of a stop adapted to be depressed by a car, means for controlling the depression of such stop, and means actuated by a car for again restoring such stop to its normal position after depression.

In witness whereof, I have hereunto subscribed my name this 18th day of March, 1919.

GEORGE N. SIMPSON.